(12) United States Patent
Huang et al.

(10) Patent No.: US 11,095,224 B2
(45) Date of Patent: Aug. 17, 2021

(54) CURRENT EQUALIZATION CIRCUIT, CURRENT EQUALIZATION ARRAY CIRCUIT, AND MULTIPHASE CONVERTER

(71) Applicant: Huawei Technologies Co., Ltd., Shenzhen (CN)

(72) Inventors: Dongqi Huang, Shenzhen (CN); Shaoqing Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 16/692,381

(22) Filed: Nov. 22, 2019

(65) Prior Publication Data

US 2020/0091823 A1    Mar. 19, 2020

Related U.S. Application Data

(63) Continuation of application No. PCT/CN2017/115337, filed on Dec. 8, 2017.

(30) Foreign Application Priority Data

May 24, 2017   (CN) .......................... 201710374931.1

(51) Int. Cl.
  *H02M 3/158*   (2006.01)
(52) U.S. Cl.
  CPC ................................. *H02M 3/1584* (2013.01)
(58) Field of Classification Search
  CPC ....... H02M 3/1584; H02M 2001/0025; H02M 2001/0009
  See application file for complete search history.

(56) References Cited

U.S. PATENT DOCUMENTS

| | | |
|---|---|---|
| 6,285,571 B1 | 9/2001 | Brooks et al. |
| 6,362,608 B1 * | 3/2002 | Ashburn ............. H02M 3/1584 323/272 |
| 6,404,175 B1 | 6/2002 | Yang et al. |
| 6,768,658 B2 | 7/2004 | Perry |
| 6,894,466 B2 | 5/2005 | Huang et al. |
| 7,053,713 B1 | 5/2006 | Dening |

(Continued)

FOREIGN PATENT DOCUMENTS

| | | |
|---|---|---|
| CN | 101662212 A | 3/2010 |
| CN | 201690362 U | 12/2010 |

(Continued)

*Primary Examiner* — Kyle J Moody
(74) *Attorney, Agent, or Firm* — Conley Rose, P.C.

(57) ABSTRACT

In a current equalization circuit, where a first inductor is connected to a first resistor, a second inductor is connected to both the first inductor and a second resistor, the input end of the first resistor and the input end of the second resistor are respectively connected to a first input end and a second input end of an error detection sub-circuit, a first output end of the error detection sub-circuit is connected to a first error adjustment sub-circuit, a second output end of the error detection sub-circuit is connected to a second error adjustment sub-circuit, the first error adjustment sub-circuit adjusts an input current of the first inductor based on a voltage signal from the error detection sub-circuit, and the second error adjustment sub-circuit adjusts an input current of the second inductor based on a voltage signal from the error detection sub-circuit.

20 Claims, 4 Drawing Sheets

(56) References Cited

U.S. PATENT DOCUMENTS

| | | | |
|---|---|---|---|
| 7,923,977 B2 * | 4/2011 | Huang | H02M 3/1584 |
| | | | 323/271 |
| 8,030,911 B2 | 10/2011 | Nien et al. | |
| 8,378,650 B2 | 2/2013 | Maher | |
| 8,502,515 B1 | 8/2013 | Wan et al. | |
| 8,648,639 B2 * | 2/2014 | Lee | H02M 3/156 |
| | | | 327/175 |
| 2003/0214354 A1 | 11/2003 | Chen et al. | |
| 2007/0013356 A1 * | 1/2007 | Qiu | H02M 3/1588 |
| | | | 323/288 |
| 2007/0296387 A1 | 12/2007 | Dong et al. | |
| 2010/0013305 A1 | 1/2010 | Heineman | |
| 2010/0013307 A1 | 1/2010 | Heineman et al. | |
| 2011/0025248 A1 | 2/2011 | Jang et al. | |
| 2011/0133704 A1 * | 6/2011 | Zambetti | H02M 3/1584 |
| | | | 323/212 |
| 2013/0293203 A1 | 11/2013 | Chen et al. | |
| 2014/0097818 A1 | 4/2014 | Wiktor et al. | |
| 2014/0111179 A1 | 4/2014 | Couleur et al. | |
| 2015/0338862 A1 | 11/2015 | Shin et al. | |

FOREIGN PATENT DOCUMENTS

| | | |
|---|---|---|
| CN | 101989813 A | 3/2011 |
| CN | 102931837 A | 2/2013 |
| CN | 103248231 A | 8/2013 |
| CN | 103647271 A | 3/2014 |
| CN | 103731023 A | 4/2014 |
| CN | 103780091 A | 5/2014 |
| CN | 104539155 A | 4/2015 |
| CN | 104866054 A | 8/2015 |
| CN | 105099188 A | 11/2015 |
| CN | 106257812 A | 12/2016 |
| WO | 03084038 A2 | 10/2003 |
| WO | 2006023522 A1 | 3/2006 |

* cited by examiner

CURRENT EQUALIZATION CIRCUIT, CURRENT EQUALIZATION ARRAY CIRCUIT, AND MULTIPHASE CONVERTER

CROSS-REFERENCE TO RELATED APPLICATIONS

This application is a continuation application of International Patent Application No. PCT/CN2017/115337, filed on Dec. 8, 2017, which claims priority to Chinese Patent Application No. 201710374931.1, filed on May 24, 2017, both of which are hereby incorporated by reference in their entireties.

TECHNICAL FIELD

This application relates to the field of electronic technologies, and in particular, to a current equalization circuit, a current equalization array circuit, and a multiphase converter.

BACKGROUND

With rapid development of electronic technologies, direct current-direct current (DC-DC) converters are widely applied to power supply systems of electronic devices. A value of a saturation current of a chip inductor in a DC-DC converter determines a rated loading capability of the DC-DC converter. Usually, chip inductors of a plurality of phases are disposed in parallel to improve the rated loading capability of the DC-DC converter. However, a problem of unequal currents among the phases exists in the chip inductors of the plurality of phases.

In other approaches, an input current of an inductor of each phase is adjusted based on a sampled current of the inductor of the phase and an average sampled current of inductors of phases, to implement current equalization among the inductors of the phases. For example, inductors of four phases are connected in parallel. The inductors of the four phases are A, B, C, and D. A sampled current of A is a, a sampled current of B is b, a sampled current of C is c, a sampled current of D is d, and an average sampled current of the inductors of the four phases is (a+b+c+d)/4. An input current of an inductor of each phase is adjusted based on a sampled current of the inductor of the phase and the average sampled current of the inductors of the phases, to implement current equalization among the inductors of the phases.

However, in the solution in other approaches, a circuit is complex.

SUMMARY

This application provides a current equalization circuit, a current equalization array circuit, and a multiphase converter, to resolve a technical problem of a relatively complex circuit in other approaches.

According to a first aspect, this application provides a current equalization circuit, where the current equalization circuit may include a first inductor and a first resistor, where an output end of the first inductor is connected to an input end of the first resistor, an output end of the first resistor is grounded, and the input end of the first resistor is connected to a first input end of an error detection sub-circuit, a second inductor and a second resistor, where an output end of the second inductor is connected to both the output end of the first inductor and an input end of the second resistor, an output end of the second resistor is grounded, and the input end of the second resistor is connected to a second input end of the error detection sub-circuit, the error detection sub-circuit, where a first output end of the error detection sub-circuit is connected to a first input end of a first error adjustment sub-circuit, a second output end of the error detection sub-circuit is connected to a first input end of a second error adjustment sub-circuit, and the error detection sub-circuit is configured to perform amplification processing on a difference between a voltage at the first input end of the error detection sub-circuit and a voltage at the second input end of the error detection sub-circuit, the first error adjustment sub-circuit, including two input ends, where the two input ends are separately used to receive a preset input signal and a voltage signal that is input from the first output end of the error detection sub-circuit, and the first error adjustment sub-circuit is configured to adjust an input current of the first inductor based on the preset input signal and a voltage signal that is input from the first input end of the error detection sub-circuit, and the second error adjustment sub-circuit, including two input ends, where the two input ends are separately used to receive a preset input signal and a voltage signal that is input from the second output end of the error detection sub-circuit, and the second error adjustment sub-circuit is configured to adjust an input current of the second inductor based on the preset input signal and a voltage signal that is input from the second input end of the error detection sub-circuit.

According to the current equalization circuit provided in this application, the input end of the first resistor corresponding to the first inductor and the input end of the second resistor corresponding to the second inductor are directly connected to the input ends of the error detection sub-circuit, where the first inductor and the second inductor are to be equalized. In this way, the error detection sub-circuit can directly detect the difference between the voltage at the first input end of the error detection sub-circuit and the voltage at the second input end of the error detection sub-circuit in order to adjust the input current of the first inductor using the first error adjustment sub-circuit and adjust the input current of the second inductor using the second error adjustment sub-circuit. This implements equalization between the current of the first inductor and the current of the second inductor, thereby reducing circuit complexity.

In a possible implementation, the error detection sub-circuit may include an operational transimpedance amplifier, a third resistor, and a fourth resistor, where a first input end of the operational transimpedance amplifier is connected to the input end of the first resistor, a second input end of the operational transimpedance amplifier is connected to the input end of the second resistor, a first output end of the operational transimpedance amplifier and an output end of the third resistor are both connected to the first input end of the first error adjustment sub-circuit, a second output end of the operational transimpedance amplifier and an output end of the fourth resistor are both connected to the first input end of the second error adjustment sub-circuit, and a preset voltage signal is input to each of an input end of the third resistor and an input end of the fourth resistor.

In a possible implementation, the first error adjustment sub-circuit may include a first pulse width modulation (PWM) comparator, a first reset-set (RS) flip-flop, and a first power-stage adjustment sub-circuit, where a first input end of the first PWM comparator is connected to the first output end of the error detection sub-circuit, a preset input signal is input to a second input end of the first PWM comparator, an output end of the first PWM comparator is connected to a first input end of the first RS flip-flop, a preset square wave signal is input to a second input end of the first RS flip-flop, a first output end of the first RS flip-flop is connected to a first input end of the first power-stage adjustment sub-circuit, a second output end of the first RS flip-flop is connected to a second input end of the first power-stage adjustment sub-circuit, and an output end of the first power-stage adjustment sub-circuit is connected to an input end of the first inductor, and the first power-stage adjustment sub-circuit is configured to adjust the input current of the first inductor based on a signal at the first output end of the first RS flip-flop and a signal at the second output end of the first RS flip-flop.

In a possible implementation, the second error adjustment sub-circuit may include a second PWM comparator, a second RS flip-flop, and a second power-stage adjustment sub-circuit, where a first input end of the second PWM comparator is connected to the first output end of the error detection sub-circuit, a preset input signal is input to a second input end of the second PWM comparator, an output end of the second PWM comparator is connected to a first input end of the second RS flip-flop, a preset square wave signal is input to a second input end of the second RS flip-flop, a first output end of the second RS flip-flop is connected to a first input end of the second power-stage adjustment sub-circuit, a second output end of the first RS flip-flop is connected to a second input end of the second power-stage adjustment sub-circuit, and an output end of the second power-stage adjustment sub-circuit is connected to an input end of the second inductor, and the second power-stage adjustment sub-circuit is configured to adjust the input current of the second inductor based on a signal at the first output end of the second RS flip-flop and a signal at the second output end of the second RS flip-flop.

In a possible implementation, the first power-stage adjustment sub-circuit may include a first drive sub-circuit, a second drive sub-circuit, a first metal-oxide-semiconductor (MOS) transistor, and a second MOS transistor, where an input end of the first drive sub-circuit is connected to the first output end of the first RS flip-flop, an output end of the first drive sub-circuit is connected to a gate of the first MOS transistor, an input end of the second drive sub-circuit is connected to the second output end of the first RS flip-flop, an output end of the second drive sub-circuit is connected to a gate of the second MOS transistor, a drain of the first MOS transistor and a source of the second MOS transistor are both connected to the input end of the first inductor, a source of the first MOS transistor is grounded, and a drain of the second MOS transistor is connected to a first power supply.

In a possible implementation, the second power-stage adjustment sub-circuit may include a third drive sub-circuit, a fourth drive sub-circuit, a third MOS transistor, and a fourth MOS transistor, where an input end of the third drive sub-circuit is connected to the first output end of the second RS flip-flop, an output end of the third drive sub-circuit is connected to a gate of the third MOS transistor, an input end of the fourth drive sub-circuit is connected to the second output end of the second RS flip-flop, an output end of the fourth drive sub-circuit is connected to a gate of the fourth MOS transistor, a drain of the third MOS transistor and a source of the fourth MOS transistor are both connected to the input end of the second inductor, a source of the third MOS transistor is grounded, and a drain of the fourth MOS transistor is connected to a second power supply.

In a possible implementation, the current equalization circuit may further include a first current detection sub-circuit and a second current detection sub-circuit, where an input end of the first current detection sub-circuit is connected to the output end of the first inductor, an output end of the first current detection sub-circuit is connected to the input end of the first resistor, and the first current detection sub-circuit is configured to detect a sampled current of the first inductor and perform scaling processing on the sampled current of the first inductor, and an input end of the second current detection sub-circuit is connected to the output end of the second inductor, an output end of the second current detection sub-circuit is connected to both the output end of the first current detection sub-circuit and the input end of the second resistor, and the second current detection sub-circuit is configured to detect a sampled current of the second inductor and perform scaling processing on the sampled current of the second inductor.

In a possible implementation, the error detection sub-circuit may further include a voltage regulation sub-circuit and an output voltage feedback sub-circuit, where an output end of the voltage regulation sub-circuit is connected to both the input end of the third resistor and the input end of the fourth resistor, a first input end of the voltage regulation sub-circuit is connected to a first output end of the output voltage feedback sub-circuit, a reference voltage signal is input to a second input end of the voltage regulation sub-circuit, a second output end of the output voltage feedback sub-circuit is grounded, a third output end of the output voltage feedback sub-circuit is grounded, and an input end of the output voltage feedback sub-circuit is connected to both the output end of the first current detection sub-circuit and the output end of the second current detection sub-circuit, the input end of the voltage feedback sub-circuit is used to receive a current signal of the first inductor and a current signal of the second inductor, and the voltage feedback sub-circuit is configured to convert the current signal of the first inductor and the current signal of the second inductor into a voltage signal and perform voltage division processing on the voltage signal obtained after the conversion, and an input end of the voltage regulation sub-circuit is used to receive a voltage signal obtained after the voltage division processing performed by the voltage feedback sub-circuit, and the voltage regulation sub-circuit adjusts, based on the reference voltage signal, the voltage signal obtained after the voltage division processing performed by the voltage feedback sub-circuit such that the output end of the voltage regulation sub-circuit inputs a preset voltage signal to the input end of the third resistor and the input end of the fourth resistor.

In a possible implementation, the voltage regulation sub-circuit may include an error amplifier, a first impedance network, and a second impedance network, where the error amplifier, the first impedance network, and the second impedance network, where a first input end of the error amplifier is connected to both an output end of the first impedance network and an input end of the second impedance network, a reference voltage signal is input to a second input end of the error amplifier, an output end of the error amplifier and an output end of the second impedance network are both connected to the input end of the third resistor and the input end of the fourth resistor, and an input end of the first impedance network is connected to the first output end of the output voltage feedback sub-circuit.

In a possible implementation, the output voltage feedback sub-circuit may include a fifth resistor, a sixth resistor, and a capacitor, where the fifth resistor, the sixth resistor, and the capacitor, where an input end of the fifth resistor and an input end of the capacitor are both connected to the output end of the first current detection sub-circuit, the input end of the fifth resistor and the input end of the capacitor are both connected to the output end of the second current detection sub-circuit, an output end of the fifth resistor is connected to both an input end of the sixth resistor and the input end of the voltage regulation sub-circuit, an output end of the sixth resistor is grounded, and an output end of the capacitor is grounded.

According to a second aspect, this application provides a current equalization array circuit. The current equalization array circuit may include at least two current equalization circuit units, where a first current equalization circuit unit and a second current equalization circuit unit are any two adjacent current equalization circuit units in the at least two current equalization circuit units, a first output end of an error detection sub-circuit in the first current equalization electronic unit is connected to a second output end of an error detection sub-circuit in the second current equalization electronic unit, and any one of the current equalization circuit units includes a first inductor and a first resistor, where an output end of the first inductor is connected to an input end of the first resistor, an output end of the first resistor is grounded, and the input end of the first resistor is connected to a first input end of an error detection sub-circuit, a second inductor and a second resistor, where an output end of the second inductor is connected to both the output end of the first inductor and an input end of the second resistor, an output end of the second resistor is grounded, and the input end of the second resistor is connected to a second input end of the error detection sub-circuit, the error detection sub-circuit, where a first output end of the error detection sub-circuit is connected to a first input end of a first error adjustment sub-circuit, a second output end of the error detection sub-circuit is connected to a first input end of a second error adjustment sub-circuit, and the error detection sub-circuit is configured to perform amplification processing on a difference between a voltage at the first input end of the error detection sub-circuit and a voltage at the second input end of the error detection sub-circuit, the first error adjustment sub-circuit, including two input ends, where the two input ends are separately used to receive a preset input signal and a voltage signal that is input from the first output end of the error detection sub-circuit, and the first error adjustment sub-circuit is configured to adjust an input current of the first inductor based on the preset input signal and a voltage signal that is input from the first input end of the error detection sub-circuit, and the second error adjustment sub-circuit, including two input ends, where the two input ends are separately used to receive a preset input signal and a voltage signal that is input from the second output end of the error detection sub-circuit, and the second error adjustment sub-circuit is configured to adjust an input current of the second inductor based on the preset input signal and a voltage signal that is input from the second input end of the error detection sub-circuit.

According to the current equalization array circuit provided in this application, the current equalization array circuit may include the at least two current equalization circuit units. The input end of the first resistor corresponding to the first inductor and the input end of the second resistor corresponding to the second inductor in the any one of the current equalization circuit units are directly connected to the input ends of the error detection sub-circuit, where the first inductor and the second inductor are to be equalized. In this way, the error detection sub-circuit can directly detect the difference between the voltage at the first input end of the error detection sub-circuit and the voltage at the second input end of the error detection sub-circuit in order to adjust the input current of the first inductor using the first error adjustment sub-circuit and adjust the input current of the second inductor using the second error adjustment sub-circuit. This implements equalization between the current of the first inductor and the current of the second inductor, thereby reducing circuit complexity.

In a possible implementation, the error detection sub-circuit may include an operational transimpedance amplifier, a third resistor, and a fourth resistor, where a first input end of the operational transimpedance amplifier is connected to the input end of the first resistor, a second input end of the operational transimpedance amplifier is connected to the input end of the second resistor, a first output end of the operational transimpedance amplifier and an output end of the third resistor are both connected to the first input end of the first error adjustment sub-circuit, a second output end of the operational transimpedance amplifier and an output end of the fourth resistor are both connected to the first input end of the second error adjustment sub-circuit, and a preset voltage signal is input to each of an input end of the third resistor and an input end of the fourth resistor.

In a possible implementation, the first error adjustment sub-circuit may include a first PWM comparator, a first RS flip-flop, and a first power-stage adjustment sub-circuit, where a first input end of the first PWM comparator is connected to the first output end of the error detection sub-circuit, a preset input signal is input to a second input end of the first PWM comparator, an output end of the first PWM comparator is connected to a first input end of the first RS flip-flop, a preset square wave signal is input to a second input end of the first RS flip-flop, a first output end of the first RS flip-flop is connected to a first input end of the first power-stage adjustment sub-circuit, a second output end of the first RS flip-flop is connected to a second input end of the first power-stage adjustment sub-circuit, and an output end of the first power-stage adjustment sub-circuit is connected to an input end of the first inductor, and the first power-stage adjustment sub-circuit is configured to adjust the input current of the first inductor based on a signal at the first output end of the first RS flip-flop and a signal at the second output end of the first RS flip-flop.

In a possible implementation, the second error adjustment sub-circuit may include a second PWM comparator, a second RS flip-flop, and a second power-stage adjustment sub-circuit, where a first input end of the second PWM comparator is connected to the first output end of the error detection sub-circuit, a preset input signal is input to a second input end of the second PWM comparator, an output end of the second PWM comparator is connected to a first input end of the second RS flip-flop, a preset square wave signal is input to a second input end of the second RS flip-flop, a first output end of the second RS flip-flop is connected to a first input end of the second power-stage adjustment sub-circuit, a second output end of the first RS flip-flop is connected to a second input end of the second power-stage adjustment sub-circuit, and an output end of the second power-stage adjustment sub-circuit is connected to an input end of the second inductor, and the second power-stage adjustment sub-circuit is configured to adjust the input current of the second inductor based on a signal at the first output end of the second RS flip-flop and a signal at the second output end of the second RS flip-flop.

In a possible implementation, the first power-stage adjustment sub-circuit may include a first drive sub-circuit, a second drive sub-circuit, a first MOS transistor, and a second MOS transistor, where an input end of the first drive sub-circuit is connected to the first output end of the first RS flip-flop, an output end of the first drive sub-circuit is connected to a gate of the first MOS transistor, an input end of the second drive sub-circuit is connected to the second output end of the first RS flip-flop, an output end of the second drive sub-circuit is connected to a gate of the second MOS transistor, a drain of the first MOS transistor and a source of the second MOS transistor are both connected to the input end of the first inductor, a source of the first MOS transistor is grounded, and a drain of the second MOS transistor is connected to a first power supply.

In a possible implementation, the second power-stage adjustment sub-circuit may include a third drive sub-circuit, a fourth drive sub-circuit, a third MOS transistor, and a fourth MOS transistor, where an input end of the third drive sub-circuit is connected to the first output end of the second RS flip-flop, an output end of the third drive sub-circuit is connected to a gate of the third MOS transistor, an input end of the fourth drive sub-circuit is connected to the second output end of the second RS flip-flop, an output end of the fourth drive sub-circuit is connected to a gate of the fourth MOS transistor, a drain of the third MOS transistor and a source of the fourth MOS transistor are both connected to the input end of the second inductor, a source of the third MOS transistor is grounded, and a drain of the fourth MOS transistor is connected to a second power supply.

In a possible implementation, the circuit equalization array circuit may further include a first current detection sub-circuit and a second current detection sub-circuit, where an input end of the first current detection sub-circuit is connected to the output end of the first inductor, an output end of the first current detection sub-circuit is connected to the input end of the first resistor, and the first current detection sub-circuit is configured to detect a sampled current of the first inductor and perform scaling processing on the sampled current of the first inductor, and an input end of the second current detection sub-circuit is connected to the output end of the second inductor, an output end of the second current detection sub-circuit is connected to both the output end of the first current detection sub-circuit and the input end of the second resistor, and the second current detection sub-circuit is configured to detect a sampled current of the second inductor and perform scaling processing on the sampled current of the second inductor.

In a possible implementation, the error detection sub-circuit may further include a voltage regulation sub-circuit and an output voltage feedback sub-circuit, where an output end of the voltage regulation sub-circuit is connected to both the input end of the third resistor and the input end of the fourth resistor, a first input end of the voltage regulation sub-circuit is connected to a first output end of the output voltage feedback sub-circuit, a reference voltage signal is input to a second input end of the voltage regulation sub-circuit, a second output end of the output voltage feedback sub-circuit is grounded, a third output end of the output voltage feedback sub-circuit is grounded, and an input end of the output voltage feedback sub-circuit is connected to both the output end of the first current detection sub-circuit and the output end of the second current detection sub-circuit, the input end of the voltage feedback sub-circuit is used to receive a current signal of the first inductor and a current signal of the second inductor, and the voltage feedback sub-circuit is configured to convert the current signal of the first inductor and the current signal of the second inductor into a voltage signal and perform voltage division processing on the voltage signal obtained after the conversion, and an input end of the voltage regulation sub-circuit is used to receive a voltage signal obtained after the voltage division processing performed by the voltage feedback sub-circuit, and the voltage regulation sub-circuit adjusts, based on the reference voltage signal, the voltage signal obtained after the voltage division processing performed by the voltage feedback sub-circuit such that the output end of the voltage regulation sub-circuit inputs a preset voltage signal to the input end of the third resistor and the input end of the fourth resistor.

In a possible implementation, the voltage regulation sub-circuit may include an error amplifier, a first impedance network, and a second impedance network, where a first input end of the error amplifier is connected to both an output end of the first impedance network and an input end of the second impedance network, a reference voltage signal is input to a second input end of the error amplifier, an output end of the error amplifier and an output end of the second impedance network are both connected to the input end of the third resistor and the input end of the fourth resistor, and an input end of the first impedance network is connected to the first output end of the output voltage feedback sub-circuit.

In a possible implementation, the output voltage feedback sub-circuit may include a fifth resistor, a sixth resistor, and a capacitor, where an input end of the fifth resistor and an input end of the capacitor are both connected to the output end of the first current detection sub-circuit, the input end of the fifth resistor and the input end of the capacitor are both connected to the output end of the second current detection sub-circuit, an output end of the fifth resistor is connected to both an input end of the sixth resistor and the input end of the voltage regulation sub-circuit, an output end of the sixth resistor is grounded, and an output end of the capacitor is grounded.

According to a third aspect, this application provides a multiphase converter, where the multiphase converter may include the current equalization array circuit according to any possible implementation of the second aspect.

According to the current equalization circuit, the current equalization array circuit, and the multiphase converter provided in this application, the current equalization circuit includes the first inductor and the first resistor, where the output end of the first inductor is connected to the input end of the first resistor, the output end of the first resistor is grounded, and the input end of the first resistor is connected to the first input end of the error detection sub-circuit, the second inductor and the second resistor, where the output end of the second inductor is connected to both the output end of the first inductor and the input end of the second resistor, the output end of the second resistor is grounded, and the input end of the second resistor is connected to the second input end of the error detection sub-circuit, the error detection sub-circuit, where the first output end of the error detection sub-circuit is connected to the first input end of the first error adjustment sub-circuit, the second output end of the error detection sub-circuit is connected to the first input end of the second error adjustment sub-circuit, and the error detection sub-circuit is configured to perform amplification processing on the difference between the voltage at the first input end of the error detection sub-circuit and the voltage at the second input end of the error detection sub-circuit, the first error adjustment sub-circuit, including the two input ends, where the two input ends are separately used to receive the preset input signal and the voltage signal that is input from the first output end of the error detection sub-circuit, and the first error adjustment sub-circuit is configured to adjust the input current of the first inductor based on the preset input signal and the voltage signal that is input from the first input end of the error detection sub-circuit, and the second error adjustment sub-circuit, including the two input ends, where the two input ends are separately used to receive the preset input signal and the voltage signal that is input from the second output end of the error detection sub-circuit, and the second error adjustment sub-circuit is configured to adjust the input current of the second inductor based on the preset input signal and the voltage signal that is input from the second input end of the error detection sub-circuit. It can be learned that, according to the current equalization circuit provided in the embodiments of this application, the input end of the first resistor corresponding to the first inductor and the input end of the second resistor corresponding to the second inductor are directly connected to the two input ends of the error detection sub-circuit, where the first inductor and the second inductor are to be equalized. In this way, the error detection sub-circuit can directly detect the difference between the voltage at the first input end of the error detection sub-circuit and the voltage at the second input end of the error detection sub-circuit in order to adjust the input current of the first inductor using the first error adjustment sub-circuit and adjust the input current of the second inductor using the second error adjustment sub-circuit. This implements equalization between the current of the first inductor and the current of the second inductor, thereby reducing circuit complexity.

DESCRIPTION OF EMBODIMENTS

To improve a rated loading capability of a DC-DC converter, chip inductors of a plurality of phases may be disposed in parallel. An input current of an inductor of each phase is adjusted based on a sampled current of the inductor of the phase and an average sampled current of the inductors of the phases, to implement current equalization among the inductors of the phases. However, in this manner, the average sampled current of the inductors of the phases needs to be calculated in advance, resulting in a relatively complex circuit. Embodiments of this application provide a current equalization circuit and a multiphase converter, to reduce circuit complexity while implementing current equalization among inductors of phases, without a need of calculating an average sampled current of the inductors of the phases in advance.

Specific embodiments are used below to describe in detail the technical solutions of this application. The following several specific embodiments may be combined with each other, and a same or similar concept or process may not be described repeatedly in some embodiments.

Figure 1:
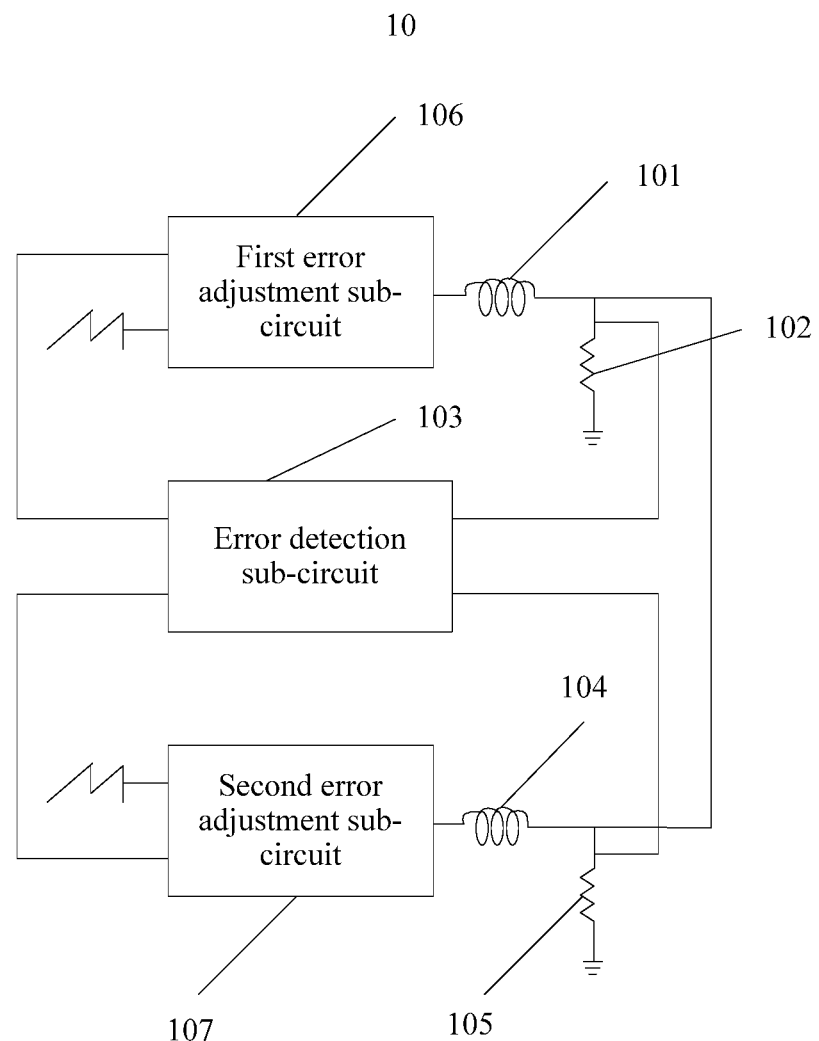
FIG. 1 is a schematic structural diagram of a current equalization circuit according to an embodiment of this application.

FIG. 1 is a schematic structural diagram of a current equalization circuit 10 according to an embodiment of this application. As shown in FIG. 1, the current equalization circuit 10 may include a first inductor 101 and a first resistor 102, where an output end of the first inductor 101 is connected to an input end of the first resistor 102, an output end of the first resistor 102 is grounded, and the input end of the first resistor 102 is connected to a first input end of an error detection sub-circuit 103, a second inductor 104 and a second resistor 105, where an output end of the second inductor 104 is connected to both the output end of the first inductor 101 and an input end of the second resistor 105, an output end of the second resistor 105 is grounded, and the input end of the second resistor 105 is connected to a second input end of the error detection sub-circuit 103, the error detection sub-circuit 103, where a first output end of the error detection sub-circuit 103 is connected to a first input end of a first error adjustment sub-circuit 106, a second output end of the error detection sub-circuit 103 is connected to a first input end of a second error adjustment sub-circuit 107, and the error detection sub-circuit 103 is configured to perform amplification processing on a difference between a voltage at the first input end of the error detection sub-circuit 103 and a voltage at the second input end of the error detection sub-circuit 103, the first error adjustment sub-circuit 106, including two input ends, where the two input ends are separately used to receive a preset input signal and a voltage signal that is input from the first output end of the error detection sub-circuit 103, and the first error adjustment sub-circuit 106 is configured to adjust an input current of the first inductor 101 based on the preset input signal and a voltage signal that is input from the first input end of the error detection sub-circuit 103, and the second error adjustment sub-circuit 107, including two input ends, where the two input ends are separately used to receive a preset input signal and a voltage signal that is input from the second output end of the error detection sub-circuit 103, and the second error adjustment sub-circuit 107 is configured to adjust an input current of the second inductor 104 based on the preset input signal and a voltage signal that is input from the second input end of the error detection sub-circuit 103.

The preset input signal may be a sawtooth signal or a triangular wave signal. A type of the preset input signal is not specifically limited in this application. In this embodiment of this application, an example in which the preset input signal is a triangular wave signal is used for description. It should be noted that when the preset input signal is a triangular wave signal, clock resetting needs to be performed in a process of adjusting the current of the first inductor, or when the preset input signal is a sawtooth signal, clock resetting does not need to be performed in a process of adjusting the current of the first inductor.

In a process of implementing current equalization, the output end of the first inductor 101 is connected to the input end of the first resistor 102 such that a sampled current of the first inductor 101 can be converted into a voltage using the first resistor 102. Likewise, the output end of the second inductor 104 is connected to the input end of the second resistor 105 such that a sampled current of the second inductor 104 can be converted into a voltage using the second resistor 105. Then the input end of the first resistor 102 is connected to the first input end of the error detection sub-circuit 103, and the input end of the second resistor 105 is connected to the second input end of the error detection sub-circuit 103. In this way, the error detection sub-circuit 103 can directly detect the difference between the voltage at the first input end of the error detection sub-circuit 103 and the voltage at the second input end of the error detection sub-circuit 103, and perform amplification processing on the difference, to generate a first voltage difference signal and a second voltage difference signal. Then the first voltage difference signal is input to the first error adjustment sub-circuit 106, and the second voltage difference signal is input to the second error adjustment sub-circuit 107 such that the first error adjustment sub-circuit 106 may adjust the input current of the first inductor 101 based on the first voltage difference signal and the triangular wave signal, and the second error adjustment sub-circuit 107 may adjust the input current of the second inductor 104 based on the second voltage difference signal and the triangular wave signal, thereby implementing equalization between the current of the first inductor 101 and the current of the second inductor 104. It can be learned that, according to the current equalization circuit 10 provided in this embodiment of this application, an average value of the sampled current of the first inductor 101 and the sampled current of the second inductor 104 does not need to be obtained in advance, thereby reducing circuit complexity.

For example, in this application, a first sampled current of the first inductor 101 is greater than a second sampled current of the second inductor 104. After the first input end of the error detection sub-circuit 103 receives a first voltage signal of the first inductor 101, and the second input end of the error detection sub-circuit 103 receives a second voltage signal of the second inductor 104, the error detection sub-circuit 103 directly detects a voltage difference between the first voltage signal and the second voltage signal, and performs amplification processing on the difference, to generate a first voltage difference signal and a second voltage difference signal, where a voltage of the first voltage difference signal is less than a voltage of the second voltage difference signal. After receiving the first voltage difference signal, the first error adjustment sub-circuit 106 outputs a first pulse signal based on a comparison between the first voltage difference signal and the triangular wave signal. A duty cycle of the first pulse signal is decreased such that the input current of the first inductor 101 is decreased. Likewise, after receiving the second voltage difference signal, the second error adjustment sub-circuit 107 outputs a second pulse signal based on a comparison between the second voltage difference signal and the triangular wave signal. A duty cycle of the second pulse signal is increased such that the input current of the second inductor 104 is increased. In this way, equalization between the current of the first inductor 101 and the current of the second inductor 104 is implemented.

It should be noted that if a non-ideal factor, for example, a case in which an offset voltage is input to the error detection sub-circuit 103, can be ignored, after current equalization is performed using the current equalization circuit 10, the sampled current of the first inductor 101 is certainly equal to the sampled current of the second inductor 104.

The current equalization circuit 10 provided in this application includes the first inductor 101 and the first resistor 102, where the output end of the first inductor 101 is connected to the input end of the first resistor 102, the output end of the first resistor 102 is grounded, and the input end of the first resistor 102 is connected to the first input end of the error detection sub-circuit 103, the second inductor 104 and the second resistor 105, where the output end of the second inductor 104 is connected to both the output end of the first inductor 101 and the input end of the second resistor 105, the output end of the second resistor 105 is grounded, and the input end of the second resistor 105 is connected to the second input end of the error detection sub-circuit 103, the error detection sub-circuit 103, where the first output end of the error detection sub-circuit 103 is connected to the first input end of the first error adjustment sub-circuit 106, the second output end of the error detection sub-circuit 103 is connected to the first input end of the second error adjustment sub-circuit 107, and the error detection sub-circuit 103 is configured to perform amplification processing on the difference between the voltage at the first input end of the error detection sub-circuit 103 and the voltage at the second input end of the error detection sub-circuit 103, the first error adjustment sub-circuit 106, including the two input ends, where the two input ends are separately used to receive the preset input signal and the voltage signal that is input from the first output end of the error detection sub-circuit 103, and the first error adjustment sub-circuit 106 is configured to adjust the input current of the first inductor 101 based on the preset input signal and the voltage signal that is input from the first input end of the error detection sub-circuit 103, and the second error adjustment sub-circuit 107, including the two input ends, where the two input ends are separately used to receive the preset input signal and the voltage signal that is input from the second output end of the error detection sub-circuit 103, and the second error adjustment sub-circuit 107 is configured to adjust the input current of the second inductor 104 based on the preset input signal and the voltage signal that is input from the second input end of the error detection sub-circuit 103. It can be learned that, according to the current equalization circuit 10 provided in this embodiment of this application, the input end of the first resistor 103 corresponding to the first inductor 101 and the input end of the second resistor 105 corresponding to the second inductor 104 are directly connected to the two input ends of the error detection sub-circuit 103, where the first inductor and the second inductor are to be equalized. In this way, the error detection sub-circuit 103 can directly detect the difference between the voltage at the first input end of the error detection sub-circuit 103 and the voltage at the second input end of the error detection sub-circuit 103 in order to adjust the input current of the first inductor 101 using the first error adjustment sub-circuit 106 and adjust the input current of the second inductor 104 using the second error adjustment sub-circuit 107. This implements equalization between the current of the first inductor 101 and the current of the second inductor 104, thereby reducing circuit complexity.

Figure 2:
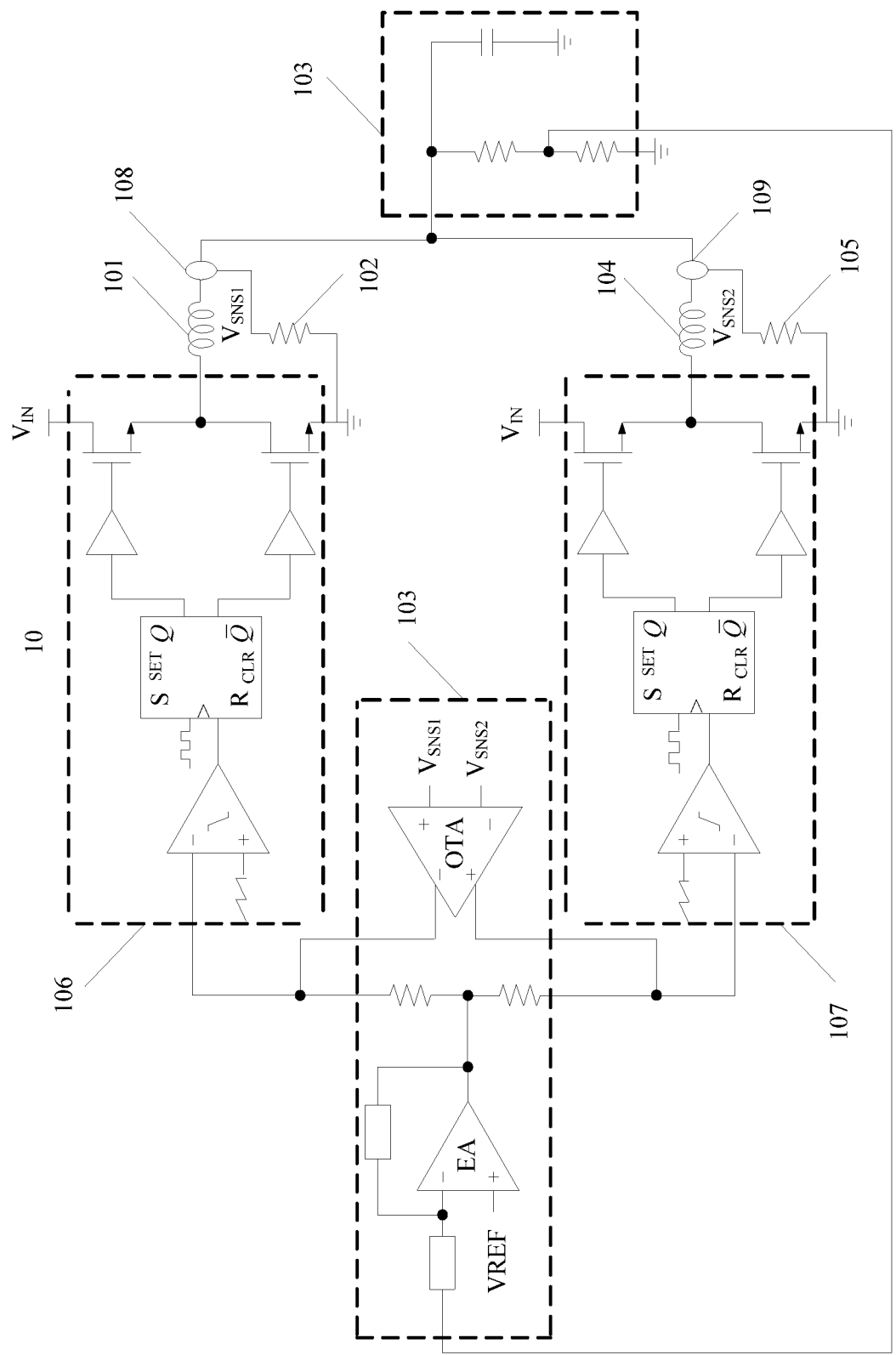
FIG. 2 is another schematic structural diagram of a current equalization circuit according to an embodiment of this application.

Based on the embodiment corresponding to FIG. 1, further refer to FIG. 2. FIG. 2 is another schematic structural diagram of the current equalization circuit 10 according to an embodiment of this application. The error detection sub-circuit 103 of the current equalization circuit 10 may include an operational transimpedance amplifier, a third resistor, and a fourth resistor.

A first input end of the operational transimpedance amplifier is connected to the input end of the first resistor 102, a second input end of the operational transimpedance amplifier is connected to the input end of the second resistor 105, a first output end of the operational transimpedance amplifier and an output end of the third resistor are both connected to the first input end of the first error adjustment sub-circuit 106, a second output end of the operational transimpedance amplifier and an output end of the fourth resistor are both connected to the first input end of the second error adjustment sub-circuit 107, and a preset voltage signal is input to each of an input end of the third resistor and an input end of the fourth resistor.

In a process of implementing current equalization, the input end of the first resistor 102 is connected to the first input end of the operational transimpedance amplifier in the error detection sub-circuit 103, and the input end of the second resistor 105 is connected to the second input end of the operational transimpedance amplifier in the error detection sub-circuit 103. In this way, the operational transimpedance amplifier can directly detect a difference between a voltage at the first input end of the operational transimpedance amplifier and a voltage at the second input end of the operational transimpedance amplifier, and perform amplification processing on the difference, to generate a current difference signal. In addition, the operational transimpedance amplifier superposes, using the first output end, the current difference signal on the preset voltage signal that is input to the input end of the third resistor, to generate a first voltage difference signal such that the first error adjustment sub-circuit 106 may adjust the input current of the first inductor 101 based on the first voltage difference signal and the triangular wave signal. Likewise, the operational transimpedance amplifier superposes, using the second output end, the current difference signal on the preset voltage signal that is input to the input end of the fourth resistor, to generate a second voltage difference signal such that the second error adjustment sub-circuit 107 may adjust the input current of the second inductor 104 based on the second voltage difference signal and the triangular wave signal. In this way, equalization between the current of the first inductor 101 and the current of the second inductor 104 is implemented.

Optionally, the first error adjustment sub-circuit 106 may include a first PWM comparator, a first RS flip-flop, and a first power-stage adjustment sub-circuit.

A first input end of the first PWM comparator is connected to the first output end of the error detection sub-circuit 103, a preset input signal is input to a second input end of the first PWM comparator, an output end of the first PWM comparator is connected to a first input end of the first RS flip-flop, a preset square wave signal is input to a second input end of the first RS flip-flop, a first output end of the first RS flip-flop is connected to a first input end of the first power-stage adjustment sub-circuit, a second output end of the first RS flip-flop is connected to a second input end of the first power-stage adjustment sub-circuit, and an output end of the first power-stage adjustment sub-circuit is connected to an input end of the first inductor 101.

The first power-stage adjustment sub-circuit is configured to adjust the input current of the first inductor 101 based on a signal at the first output end of the first RS flip-flop and a signal at the second output end of the first RS flip-flop.

In this embodiment of this application, after the first input end of the first PWM comparator receives the first voltage difference signal, the first PWM comparator may compare the first voltage difference signal with the triangular wave signal to output a first pulse signal, and input the first pulse signal to the first RS comparator such that the first RS comparator may control, based on the first pulse signal and the preset square wave signal, the first power-stage adjustment sub-circuit to be open or closed, thereby adjusting the input current of the first inductor 101.

Further, the first power-stage adjustment sub-circuit may include a first drive sub-circuit, a second drive sub-circuit, a first MOS transistor, and a second MOS transistor.

An input end of the first drive sub-circuit is connected to the first output end of the first RS flip-flop, an output end of the first drive sub-circuit is connected to a gate of the first MOS transistor, an input end of the second drive sub-circuit is connected to the second output end of the first RS flip-flop, an output end of the second drive sub-circuit is connected to a gate of the second MOS transistor, a drain of the first MOS transistor and a source of the second MOS transistor are both connected to the input end of the first inductor 101, a source of the first MOS transistor is grounded, and a drain of the second MOS transistor is connected to a first power supply.

In an actual application process, when the sampled current of the first inductor 101 is adjusted using the first drive sub-circuit, the second drive sub-circuit, the first MOS transistor, and the second MOS transistor, an output of the first drive sub-circuit does not overlap with an output of the second drive sub-circuit. Therefore, the first MOS transistor and the second MOS transistor may be enabled alternately under control. When an availability time of the second MOS transistor that is connected to the first power supply is increased, and an availability time of the first MOS transistor that is grounded is decreased, the sampled current of the first inductor 101 is increased. Otherwise, the sampled current of the first inductor 101 is decreased.

Optionally, the second error adjustment sub-circuit 107 includes a second PWM comparator, a second RS flip-flop, and a second power-stage adjustment sub-circuit.

A first input end of the second PWM comparator is connected to the first output end of the error detection sub-circuit 103, a preset input signal is input to a second input end of the second PWM comparator, an output end of the second PWM comparator is connected to a first input end of the second RS flip-flop, a preset square wave signal is input to a second input end of the second RS flip-flop, a first output end of the second RS flip-flop is connected to a first input end of the second power-stage adjustment sub-circuit, a second output end of the first RS flip-flop is connected to a second input end of the second power-stage adjustment sub-circuit, and an output end of the second power-stage adjustment sub-circuit is connected to an input end of the second inductor 104.

The second power-stage adjustment sub-circuit is configured to adjust the input current of the second inductor 104 based on a signal at the first output end of the second RS flip-flop and a signal at the second output end of the second RS flip-flop.

Similarly, in this embodiment of this application, after the first input end of the second PWM comparator receives the second voltage difference signal, the second PWM comparator may compare the second voltage difference signal with the triangular wave signal to output a second pulse signal, and input the second pulse signal to the second RS comparator such that the second RS comparator may control, based on the second pulse signal and the preset square wave signal, the second power-stage adjustment sub-circuit to be open or closed, thereby adjusting the input current of the second inductor 104.

Further, the second power-stage adjustment sub-circuit includes a third drive sub-circuit, a fourth drive sub-circuit, a third MOS transistor, and a fourth MOS transistor.

An input end of the third drive sub-circuit is connected to the first output end of the second RS flip-flop, an output end of the third drive sub-circuit is connected to a gate of the third MOS transistor, an input end of the fourth drive sub-circuit is connected to the second output end of the second RS flip-flop, an output end of the fourth drive sub-circuit is connected to a gate of the fourth MOS transistor, a drain of the third MOS transistor and a source of the fourth MOS transistor are both connected to the input end of the second inductor 104, a source of the third MOS transistor is grounded, and a drain of the fourth MOS transistor is connected to a second power supply.

In an actual application process, when the sampled current of the second inductor 104 is adjusted using the third drive sub-circuit, the fourth drive sub-circuit, the third MOS transistor, and the fourth MOS transistor, an output of the third drive sub-circuit does not overlap with an output of the fourth drive sub-circuit. Therefore, the third MOS transistor and the fourth MOS transistor may be enabled alternately under control. When an availability time of the fourth MOS transistor that is connected to the second power supply is increased, and an availability time of the third MOS transistor that is grounded is decreased, the sampled current of the second inductor 104 is increased. Otherwise, the sampled current of the second inductor 104 is decreased.

Optionally, in this embodiment of this application, the current equalization circuit 10 further includes a first current detection sub-circuit 108 and a second current detection sub-circuit 109, where an input end of the first current detection sub-circuit 108 is connected to the output end of the first inductor 101, an output end of the first current detection sub-circuit 108 is connected to the input end of the first resistor 102, and the first current detection sub-circuit 108 is configured to detect the sampled current of the first inductor 101 and perform scaling processing on the sampled current of the first inductor 101, and an input end of the second current detection sub-circuit 109 is connected to the output end of the second inductor 104, an output end of the second current detection sub-circuit 109 is connected to both the output end of the first current detection sub-circuit 108 and the input end of the second resistor 105, and the second current detection sub-circuit 109 is configured to detect the sampled current of the second inductor 104 and perform scaling processing on the sampled current of the second inductor 104.

A structure of the first current detection sub-circuit 108 and a structure of the second current detection sub-circuit 109 are not specifically limited in this embodiment of this application, provided that the sampled currents of the inductors can be collected and scaling processing can be performed on the sampled currents. The structure of the first current detection sub-circuit 108 and the structure of the second current detection sub-circuit 109 are not described in detail in this embodiment of this application.

In an actual application process, the first current detection sub-circuit 108 and the second current detection sub-circuit 109 are disposed such that the sampled current of the first inductor 101 is collected using the first current detection sub-circuit 108, and the sampled current of the first inductor 101 is scaled down based on a specific ratio. Then a processed voltage signal is input to the first input end of the error detection sub-circuit 103 using the first resistor 102. Likewise, the sampled current of the second inductor 104 is collected using the second current detection sub-circuit 109, and the sampled current of the second inductor 104 is scaled down based on a specific ratio. Then a processed voltage signal is input to the second input end of the error detection sub-circuit 103 using the second resistor 105. This can prevent a component in the circuit from being damaged because the sampled currents of the first inductor 101 and the second inductor 104 are excessively strong, thereby improving security of the circuit.

Optionally, in this embodiment of this application, the error detection sub-circuit 103 further includes a voltage regulation sub-circuit and an output voltage feedback sub-circuit.

An output end of the voltage regulation sub-circuit is connected to both the input end of the third resistor and the input end of the fourth resistor, a first input end of the voltage regulation sub-circuit is connected to a first output end of the output voltage feedback sub-circuit, a reference voltage signal is input to a second input end of the voltage regulation sub-circuit, a second output end of the output voltage feedback sub-circuit is grounded, a third output end of the output voltage feedback sub-circuit is grounded, and an input end of the output voltage feedback sub-circuit is connected to both the output end of the first inductor 101 and the output end of the second inductor 104.

The input end of the voltage feedback sub-circuit is used to receive a current signal of the first inductor 101 and a current signal of the second inductor 104, and the voltage feedback sub-circuit is configured to convert the current signal of the first inductor 101 and the current signal of the second inductor 104 into a voltage signal and perform voltage division processing on the voltage signal obtained after the conversion. An input end of the voltage regulation sub-circuit is used to receive a voltage signal obtained after the voltage division processing performed by the voltage feedback sub-circuit, and the voltage regulation sub-circuit adjusts, based on the reference voltage signal, the voltage signal obtained after the voltage division processing performed by the voltage feedback sub-circuit such that the output end of the voltage regulation sub-circuit inputs a preset voltage signal to the input end of the third resistor and the input end of the fourth resistor.

For example, in this embodiment of this application, a preset voltage input to the third resistor and a preset voltage input to the fourth resistor may be implemented by the voltage regulation sub-circuit and the output voltage feedback sub-circuit. After the input end of the output voltage feedback sub-circuit receives the first voltage signal of the first inductor 101 and the second voltage signal of the second inductor 104, the output voltage feedback sub-circuit converts the current signal of the first inductor 101 and the current signal of the second inductor 104 into a voltage signal, and performs voltage division processing on the voltage signal obtained after the conversion, to obtain a third voltage signal. To enable the output voltage feedback sub-circuit to output a same voltage value in each adjustment process, the third voltage signal may be first input to the voltage regulation sub-circuit such that the voltage regulation sub-circuit adjusts a voltage value of the third voltage signal based on the reference voltage signal, thereby inputting a stable preset voltage signal to the input end of the third resistor and the input end of the fourth resistor.

Further, the voltage regulation sub-circuit may include an error amplifier, a first impedance network, and a second impedance network.

A first input end of the error amplifier is connected to both an output end of the first impedance network and an input end of the second impedance network, a reference voltage signal is input to a second input end of the error amplifier, an output end of the error amplifier and an output end of the second impedance network are both connected to the input end of the third resistor and the input end of the fourth resistor, and an input end of the first impedance network is connected to the first output end of the output voltage feedback sub-circuit.

For example, during adjustment on the voltage value of the third voltage signal using the voltage regulation sub-circuit, the third voltage signal may be received using the first input end of the error amplifier in the voltage regulation sub-circuit, and the voltage value of the third voltage signal is compared with the reference voltage signal in order to adjust the voltage value of the third voltage signal and input the preset voltage signal to the input end of the third resistor and the input end of the fourth resistor. The first impedance network and the second impedance network are configured to perform frequency compensation in the adjustment process, to ensure stability of the voltage regulation sub-circuit in the adjustment process.

Optionally, the output voltage feedback sub-circuit may include a fifth resistor, a sixth resistor, and a capacitor.

An input end of the fifth resistor and an input end of the capacitor are both connected to the output end of the first current detection sub-circuit 108, the input end of the fifth resistor and the input end of the capacitor are both connected to the output end of the second current detection sub-circuit 109, an output end of the fifth resistor is connected to both an input end of the sixth resistor and the input end of the voltage regulation sub-circuit, an output end of the sixth resistor is grounded, and an output end of the capacitor is grounded.

In this embodiment of this application, the fifth resistor and the sixth resistor constitute a voltage division circuit. The voltage division circuit is used to scale down an output voltage based on a specific ratio, and then input a scaled-down voltage to an input end of the error amplifier. The capacitor is used to stabilize the output voltage.

In an actual application process, if the sampled current of the first inductor 101 is greater than the sampled current of the second inductor 104, because the two input ends of the operational transimpedance amplifier are separately connected to the input end of the first resistor 102 and the input end of the second resistor 105, the operational transimpedance amplifier can directly detect the difference between the voltage at the first input end of the operational transimpedance amplifier and the voltage at the second input end of the operational transimpedance amplifier, and perform amplification processing on the difference, to generate the current difference signal. In addition, the operational transimpedance amplifier superposes, using the first output end, the current difference signal on the preset voltage signal that is input to the input end of the third resistor, to generate the first voltage difference signal. Likewise, the operational transimpedance amplifier also superposes, using the second output end, the current difference signal on the preset voltage signal (where the preset voltage is a preset voltage signal output by the error amplifier) that is input to the input end of the fourth resistor, to generate the second voltage difference signal. The voltage of the first voltage difference signal is less than the voltage of the second voltage difference signal. In addition, the first voltage difference signal is input to the first PWM comparator. The first PWM comparator compares the first voltage difference signal with the triangular wave signal, to output the first pulse signal. The duty cycle of the first pulse signal is decreased. Moreover, the first pulse signal is input to the first RS comparator. The first RS comparator may control the first drive sub-circuit and the second drive sub-circuit based on the first pulse signal (with a small duty cycle) and the preset square wave signal such that the availability time of the first MOS transistor is increased under control of the first drive sub-circuit, and the availability time of the second MOS transistor is decreased under control of the second drive sub-circuit, thereby decreasing the current of the first inductor 101. In addition, the second voltage difference signal is input to the second PWM comparator. The second PWM comparator compares the second voltage difference signal with the triangular wave signal, to output the second pulse signal. The duty cycle of the second pulse signal is increased. Moreover, the second pulse signal is input to the second RS comparator. The second RS comparator may control the third drive sub-circuit and the fourth drive sub-circuit based on the second pulse signal (with a large duty cycle) and the preset square wave signal such that the availability time of the third MOS transistor is decreased under control of the third drive sub-circuit and the availability time of the fourth MOS transistor is increased under control of the fourth drive sub-circuit, thereby increasing the current of the second inductor 104. In this way, equalization between the current of the first inductor 101 and the current of the second inductor 104 is implemented. It can be learned that, according to the current equalization circuit 10 provided in this embodiment of this application, an average value of a voltage of the first inductor 101 and a voltage of the second inductor 104 does not need to be obtained in advance, thereby reducing circuit complexity.

Figure 3A:
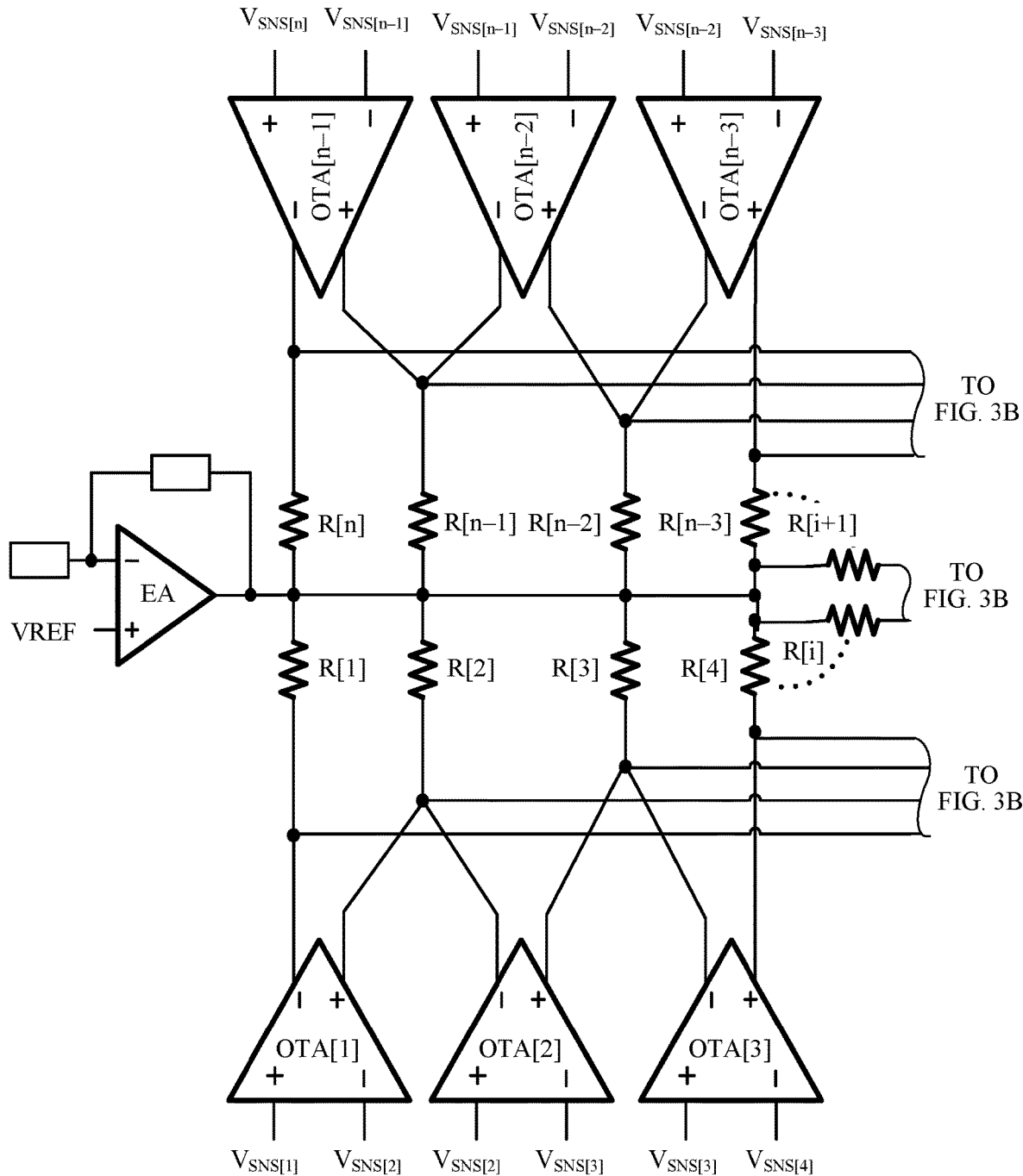
FIG. 3A is a schematic structural diagram of a current equalization array circuit according to an embodiment of this application.
Figure 3B:
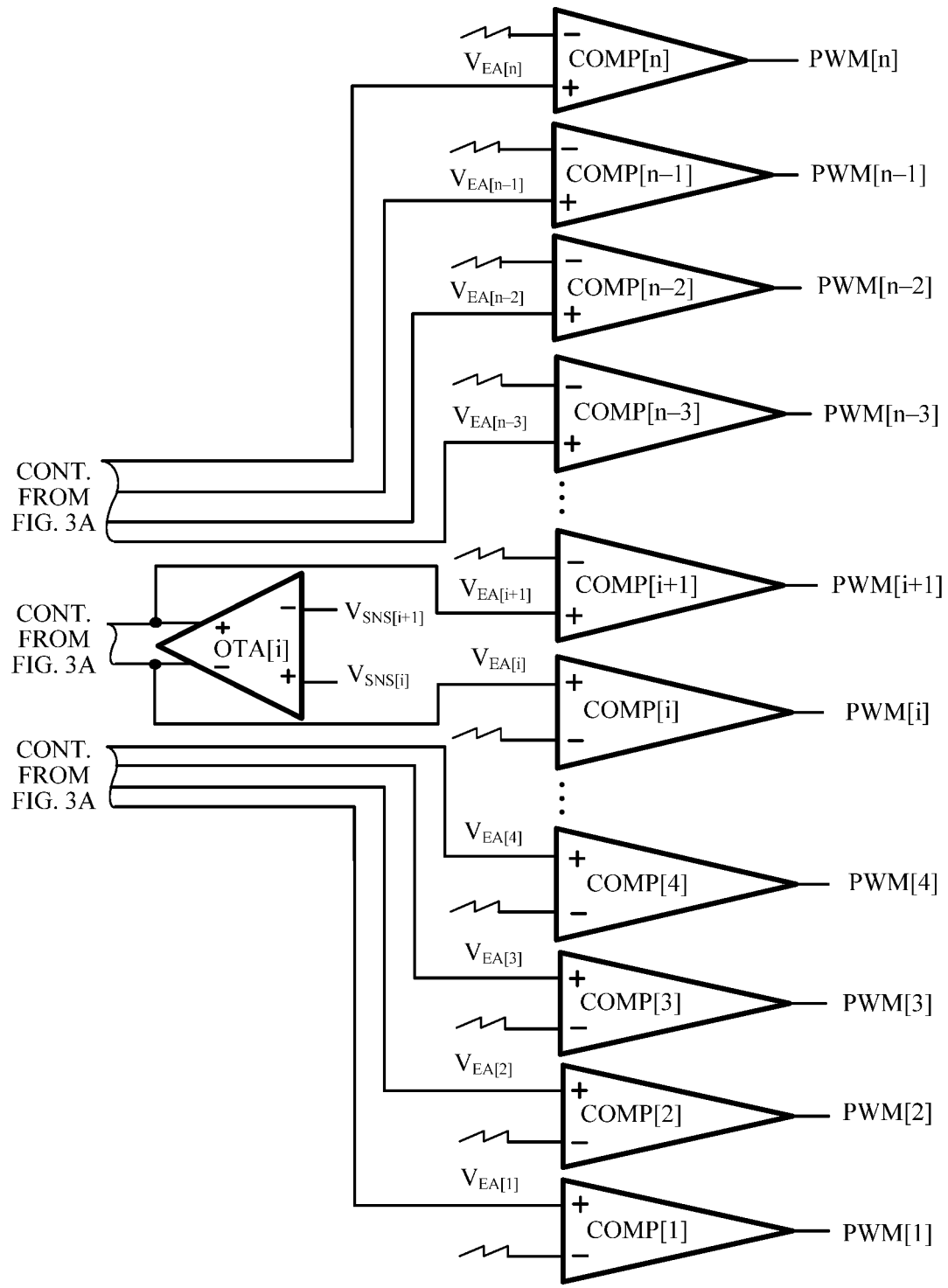
FIG. 3B is another schematic structural diagram of a current equalization array circuit according to an embodiment of this application.

FIG. 3A and FIG. 3B are a schematic structural diagram of a current equalization array circuit according to an embodiment of this application. The current equalization array circuit includes at least two current equalization circuit units, where a first current equalization circuit unit and a second current equalization circuit unit are any two adjacent current equalization circuit units in the at least two current equalization circuit units, a first output end of an error detection sub-circuit in the first current equalization electronic unit is connected to a second output end of an error detection sub-circuit in the second current equalization electronic unit, and any one of the current equalization circuit units includes a first inductor and a first resistor, where an output end of the first inductor is connected to an input end of the first resistor, an output end of the first resistor is grounded, and the input end of the first resistor is connected to a first input end of an error detection sub-circuit, a second inductor and a second resistor, where an output end of the second inductor is connected to both the output end of the first inductor and an input end of the second resistor, an output end of the second resistor is grounded, and the input end of the second resistor is connected to a second input end of the error detection sub-circuit, the error detection sub-circuit, where a first output end of the error detection sub-circuit is connected to a first input end of a first error adjustment sub-circuit, a second output end of the error detection sub-circuit is connected to a first input end of a second error adjustment sub-circuit, and the error detection sub-circuit is configured to perform amplification processing on a difference between a voltage at the first input end of the error detection sub-circuit and a voltage at the second input end of the error detection sub-circuit, the first error adjustment sub-circuit, including two input ends, where the two input ends are separately used to receive a preset input signal and a voltage signal that is input from the first output end of the error detection sub-circuit, and the first error adjustment sub-circuit is configured to adjust an input current of the first inductor based on the preset input signal and a voltage signal that is input from the first input end of the error detection sub-circuit, and the second error adjustment sub-circuit, including two input ends, where the two input ends are separately used to receive a preset input signal and a voltage signal that is input from the second output end of the error detection sub-circuit, and the second error adjustment sub-circuit is configured to adjust an input current of the second inductor based on the preset input signal and a voltage signal that is input from the second input end of the error detection sub-circuit.

Optionally, the error detection sub-circuit includes an operational transimpedance amplifier, a third resistor, and a fourth resistor.

A first input end of the operational transimpedance amplifier is connected to the input end of the first resistor, a second input end of the operational transimpedance amplifier is connected to the input end of the second resistor, a first output end of the operational transimpedance amplifier and an output end of the third resistor are both connected to the first input end of the first error adjustment sub-circuit, a second output end of the operational transimpedance amplifier and an output end of the fourth resistor are both connected to the first input end of the second error adjustment sub-circuit, and a preset voltage signal is input to each of an input end of the third resistor and an input end of the fourth resistor.

Optionally, the first error adjustment sub-circuit includes a first PWM comparator, a first RS flip-flop, and a first power-stage adjustment sub-circuit.

A first input end of the first PWM comparator is connected to the first output end of the error detection sub-circuit, a preset input signal is input to a second input end of the first PWM comparator, an output end of the first PWM comparator is connected to a first input end of the first RS flip-flop, a preset square wave signal is input to a second input end of the first RS flip-flop, a first output end of the first RS flip-flop is connected to a first input end of the first power-stage adjustment sub-circuit, a second output end of the first RS flip-flop is connected to a second input end of the first power-stage adjustment sub-circuit, and an output end of the first power-stage adjustment sub-circuit is connected to an input end of the first inductor.

The first power-stage adjustment sub-circuit is configured to adjust the input current of the first inductor based on a signal at the first output end of the first RS flip-flop and a signal at the second output end of the first RS flip-flop.

Optionally, the second error adjustment sub-circuit includes a second PWM comparator, a second RS flip-flop, and a second power-stage adjustment sub-circuit.

A first input end of the second PWM comparator is connected to the first output end of the error detection sub-circuit, a preset input signal is input to a second input end of the second PWM comparator, an output end of the second PWM comparator is connected to a first input end of the second RS flip-flop, a preset square wave signal is input to a second input end of the second RS flip-flop, a first output end of the second RS flip-flop is connected to a first input end of the second power-stage adjustment sub-circuit, a second output end of the first RS flip-flop is connected to a second input end of the second power-stage adjustment sub-circuit, and an output end of the second power-stage adjustment sub-circuit is connected to an input end of the second inductor.

The second power-stage adjustment sub-circuit is configured to adjust the input current of the second inductor based on a signal at the first output end of the second RS flip-flop and a signal at the second output end of the second RS flip-flop.

Optionally, the first power-stage adjustment sub-circuit includes a first drive sub-circuit, a second drive sub-circuit, a first MOS transistor, and a second MOS transistor.

An input end of the first drive sub-circuit is connected to the first output end of the first RS flip-flop, an output end of the first drive sub-circuit is connected to a gate of the first MOS transistor, an input end of the second drive sub-circuit is connected to the second output end of the first RS flip-flop, an output end of the second drive sub-circuit is connected to a gate of the second MOS transistor, a drain of the first MOS transistor and a source of the second MOS transistor are both connected to the input end of the first inductor, a source of the first MOS transistor is grounded, and a drain of the second MOS transistor is connected to a first power supply.

Optionally, the second power-stage adjustment sub-circuit includes a third drive sub-circuit, a fourth drive sub-circuit, a third MOS transistor, and a fourth MOS transistor.

An input end of the third drive sub-circuit is connected to the first output end of the second RS flip-flop, an output end of the third drive sub-circuit is connected to a gate of the third MOS transistor, an input end of the fourth drive sub-circuit is connected to the second output end of the second RS flip-flop, an output end of the fourth drive sub-circuit is connected to a gate of the fourth MOS transistor, a drain of the third MOS transistor and a source of the fourth MOS transistor are both connected to the input end of the second inductor, a source of the third MOS transistor is grounded, and a drain of the fourth MOS transistor is connected to a second power supply.

Optionally, the current equalization array circuit further includes a first current detection sub-circuit and a second current detection sub-circuit, where an input end of the first current detection sub-circuit is connected to the output end of the first inductor, an output end of the first current detection sub-circuit is connected to the input end of the first resistor, and the first current detection sub-circuit is configured to detect a sampled current of the first inductor and perform scaling processing on the sampled current of the first inductor, and an input end of the second current detection sub-circuit is connected to the output end of the second inductor, an output end of the second current detection sub-circuit is connected to both the output end of the first current detection sub-circuit and the input end of the second resistor, and the second current detection sub-circuit is configured to detect a sampled current of the second inductor and perform scaling processing on the sampled current of the second inductor.

Optionally, the error detection sub-circuit further includes a voltage regulation sub-circuit and an output voltage feedback sub-circuit.

An output end of the voltage regulation sub-circuit is connected to both the input end of the third resistor and the input end of the fourth resistor, a first input end of the voltage regulation sub-circuit is connected to a first output end of the output voltage feedback sub-circuit, a reference voltage signal is input to a second input end of the voltage regulation sub-circuit, a second output end of the output voltage feedback sub-circuit is grounded, a third output end of the output voltage feedback sub-circuit is grounded, and an input end of the output voltage feedback sub-circuit is connected to both the output end of the first current detection sub-circuit and the output end of the second current detection sub-circuit.

The input end of the voltage feedback sub-circuit is used to receive a current signal of the first inductor and a current signal of the second inductor, and the voltage feedback sub-circuit is configured to convert the current signal of the first inductor and the current signal of the second inductor into a voltage signal and perform voltage division processing on the voltage signal obtained after the conversion.

An input end of the voltage regulation sub-circuit is used to receive a voltage signal obtained after the voltage division processing performed by the voltage feedback sub-circuit, and the voltage regulation sub-circuit adjusts, based on the reference voltage signal, the voltage signal obtained after the voltage division processing performed by the voltage feedback sub-circuit such that the output end of the voltage regulation sub-circuit inputs a preset voltage signal to the input end of the third resistor and the input end of the fourth resistor.

Optionally, the voltage regulation sub-circuit includes an error amplifier, a first impedance network, and a second impedance network.

A first input end of the error amplifier is connected to both an output end of the first impedance network and an input end of the second impedance network, a reference voltage signal is input to a second input end of the error amplifier, an output end of the error amplifier and an output end of the second impedance network are both connected to the input end of the third resistor and the input end of the fourth resistor, and an input end of the first impedance network is connected to the first output end of the output voltage feedback sub-circuit.

Optionally, the output voltage feedback sub-circuit includes a fifth resistor, a sixth resistor, and a capacitor.

An input end of the fifth resistor and an input end of the capacitor are both connected to the output end of the first current detection sub-circuit, the input end of the fifth resistor and the input end of the capacitor are both connected to the output end of the second current detection sub-circuit, an output end of the fifth resistor is connected to both an input end of the sixth resistor and the input end of the voltage regulation sub-circuit, an output end of the sixth resistor is grounded, and an output end of the capacitor is grounded.

This application further provides a multiphase converter. The multiphase converter may include the current equalization array circuit shown in the embodiment corresponding to FIG. 3A and FIG. 3B.

The multiphase converter provided in this application may implement the technical solutions illustrated in the embodiment of the current equalization array circuit. Implementation principles and benefits thereof are similar. Details are not described herein again.

What is claimed is:

1. A current equalization circuit, comprising:
   an error detection sub-circuit comprising:
     a first input end;
     a second input end, wherein the current equalization circuit is configured to perform amplification processing on a difference between a voltage at the first input end of the error detection sub-circuit and a voltage at the second input end of the error detection sub-circuit;
     a first output end; and
     a second output end;
   a first resistor comprising:
     an input end coupled to the first input end of the error detection sub-circuit; and
     an output end that is grounded;
   a first inductor comprising:
     an input end; and
     an output end coupled to the input end of the first resistor;
   a second resistor comprising:
     an input end coupled to the second input end of the error detection sub-circuit; and
     an output end that is grounded;
   a second inductor comprising:
     an input end; and
     an output end coupled to the output end of the first inductor and the input end of the second resistor;
   the error detection sub-circuit, wherein the first output end of the error detection sub-circuit is connected to a first input end of a first error adjustment sub-circuit, the second output end of the error detection sub-circuit is connected to a first input end of a second error adjustment sub-circuit, and the error detection sub-circuit is configured to perform amplification processing on a difference between a voltage at the first input end of the error detection sub-circuit and a voltage at the second input end of the error detection sub-circuit;
   the first error adjustment sub-circuit comprising:
     the first input end coupled to the first output end of the error detection sub-circuit, wherein the first input end of the first error adjustment sub-circuit is configured to receive a voltage signal from the first output end of the error detection sub-circuit;
     a second input end configured to receive a preset input signal; and
     an output end, wherein the first error adjustment sub-circuit is configured to adjust an input current of the first inductor based on the preset input signal and the voltage signal from the first output end of the error detection sub-circuit; and
   the second error adjustment sub-circuit, comprising:
     a first input end coupled to the second output end of the error detection sub-circuit, wherein the first input end of the second error adjustment sub-circuit is configured to receive a voltage signal from the second output end of the error detection sub-circuit;
     a second input end is configured to receive the preset input signal; and
     an output end, wherein the second error adjustment sub-circuit is configured to adjust an input current of the second inductor based on the preset input signal and the voltage signal from the second input end of the error detection sub-circuit.

2. The current equalization circuit of claim 1, wherein the error detection sub-circuit comprises:
   an operational transimpedance amplifier comprising:
     a first input end coupled to the input end of the first resistor;
     a second input end coupled to the input end of the second resistor;
     a first output end coupled to the first input end of the first error adjustment sub-circuit; and
     a second output end coupled to the first input end of the second error adjustment sub-circuit;
   a third resistor comprising:
     an input end that receives a preset voltage signal; and
     an output end coupled to the first input end of the first error adjustment sub-circuit; and
   a fourth resistor comprising:
     an input end that receives the preset voltage signal; and
     an output end is coupled to the first input end of the second error adjustment sub-circuit.

3. The current equalization circuit of claim 2, further comprising:
   a first current detection sub-circuit comprising:
     an input end coupled to the output end of the first inductor, wherein the first current detection sub-circuit is configured to:
       detect a sampled current of the first inductor; and
       perform scaling processing on the sampled current of the first inductor; and
     an output end coupled to the input end of the first resistor; and
   a second current detection sub-circuit comprising:
     an input end coupled to the output end of the second inductor, wherein the second current detection sub-circuit is configured to:
       detect a sampled current of the second inductor; and
       perform scaling processing on the sampled current of the second inductor; and an output end coupled to the output end of the first current detection sub-circuit and the input end of the second resistor.

4. The current equalization circuit of claim 3, wherein the error detection sub-circuit further comprises:
an output voltage feedback sub-circuit comprising:
an input end coupled to the output end of the first current detection sub-circuit and the output end of the second current detection sub-circuit, wherein the input end of the output voltage feedback sub-circuit receives a current signal of the first inductor and a current signal of the second inductor, wherein the output voltage feedback sub-circuit is configured to:
convert the current signal of the first inductor and the current signal of the second inductor into a converted voltage signal; and
perform voltage division processing on the converted voltage signal obtained to obtain a voltage divided voltage signal; and
a first output end;
a second output end that is grounded; and
a third output end that is grounded;
a voltage regulation sub-circuit comprising:
a first input end coupled to the first output end of the output voltage feedback sub-circuit, wherein the first input end of the voltage regulation sub-circuit receives the voltage divided voltage signal obtained after the voltage division processing performed by the output voltage feedback sub-circuit, wherein the first input end of the voltage regulation sub-circuit adjusts, based on a reference voltage signal, the voltage divided voltage signal obtained after the voltage division processing performed by the output voltage feedback sub-circuit such that the output end of the voltage regulation sub-circuit inputs the preset voltage signal to the input end of the third resistor and the input end of the fourth resistor;
a second input end that receives the reference voltage signal; and
an output end coupled to both the input end of the third resistor and the input end of the fourth resistor.

5. The current equalization circuit of claim 4, wherein the voltage regulation sub-circuit comprises:
an error amplifier comprising:
a first input end;
a second input end that receives the reference voltage signal; and
an output end coupled to the input end of the third resistor and the input end of the fourth resistor;
a first impedance network comprising:
an input end coupled to the first output end of the output voltage feedback sub-circuit; and
an output end coupled to the first input end of the error amplifier; and
a second impedance network comprising:
an input end coupled the first input end of the error amplifier; and
an output end coupled to the input end of the third resistor and the input end of the fourth resistor.

6. The current equalization circuit of claim 4, wherein the output voltage feedback sub-circuit comprises:
a fifth resistor comprising:
an input end coupled to the output end of the first current detection sub-circuit and the second current detection sub-circuit; and
an output end coupled to the input end of the voltage regulation sub-circuit;

a sixth resistor:
an input end coupled to the output end of the fifth resistor; and
an output end that is grounded; and
a capacitor comprising:
an input end coupled to the output end of the first current detection sub-circuit and the second current detection sub-circuit; and
an output end that is grounded.

7. The current equalization circuit of claim 1, wherein the first error adjustment sub-circuit comprises:
a first pulse width modulation (PWM) comparator comprising:
a first input end coupled to the first output end of the error detection sub-circuit;
a second input end that receives the preset input signal; and
an output end;
a first reset-set (RS) flip-flop comprising:
a first input end coupled to the output end of the first PWM comparator;
a second input end that receives a preset square wave signal;
a first output end; and
a second output end; and
a first power-stage adjustment sub-circuit comprising:
a first input end coupled to the first output end of the first RS flip-flop;
a second input end coupled to the second output end of the first RS flip-flop; and
an output end coupled to the input end of the first inductor, wherein the first power-stage adjustment sub-circuit is configured to adjust the input current of the first inductor based on a signal at the first output end of the first RS flip-flop and a signal at the second output end of the first RS flip-flop.

8. The current equalization circuit of claim 7, wherein the first power-stage adjustment sub-circuit comprises:
a first drive sub-circuit comprising:
an input end coupled to the first output end of the first RS flip-flop; and
an output end;
a second drive sub-circuit comprising:
an input end coupled to the second output end of the first RS flip-flop; and
an output end;
a first metal oxide semiconductor (MOS) transistor comprising:
a gate coupled to the output end of the first drive sub-circuit;
a drain coupled to the input end of the first inductor; and
a source that is grounded; and
a second MOS transistor comprising:
a gate coupled to the output end of the second drive sub-circuit;
a source coupled to the input end of the first inductor; and
a drain coupled to a first power supply.

9. The current equalization circuit of claim 1, wherein the second error adjustment sub-circuit comprises:
a second PWM comparator comprising:
a first input end coupled to the first output end of the error detection sub-circuit;
a second input end that receives the preset input signal; and
an output end;

a second RS flip-flop comprising:
  a first input end coupled to the output end of the second PWM comparator;
  a second input end that receives a preset square wave signal;
  a first output end; and
  a second output end; and
a second power-stage adjustment sub-circuit comprising:
  a first input end coupled to the first output end of the second RS flip-flop;
  a second input end coupled to the second output end of the second RS flip-flop; and
  an output end coupled to the input end of the second inductor, wherein the second power-stage adjustment sub-circuit is configured to adjust the input current of the second inductor based on a signal at the first output end of the second RS flip-flop and a signal at the second output end of the second RS flip-flop.

10. The current equalization circuit of claim 9, wherein the second power-stage adjustment sub-circuit comprises:
a third drive sub-circuit comprising:
  an input end coupled to the first output end of the second RS flip-flop; and
  an output end;
a fourth drive sub-circuit comprising:
  an input end coupled to the second output end of the second RS flip-flop; and
  an output end;
a third MOS transistor comprising:
  a gate coupled to the output end of the third drive sub-circuit;
  a drain coupled to the input end of the second inductor; and
  a source that is grounded; and
a fourth MOS transistor comprising:
  a gate coupled to the output end of the fourth drive sub-circuit;
  a drain coupled to a second power supply; and
  a source coupled to the input end of the second inductor.

11. A current equalization array circuit, comprising:
a first current equalization circuit unit comprising a first error detection sub-circuit comprising a first output end; and
a second current equalization circuit unit comprising a second error detection sub-circuit comprising a second output end coupled to the first output end of the first error detection sub-circuit of the first current equalization circuit unit,
wherein the first current equalization circuit unit and the second current equalization circuit unit are adjacent, wherein any one of the first current equalization circuit unit and the second current equalization circuit unit further comprise:
an error detection sub-circuit comprising:
  a first input end; and
  a second input end, wherein the error detection sub-circuit is configured to perform amplification processing on a difference between a voltage at the first input end of the error detection sub-circuit and a voltage at the second input end of the error detection sub-circuit;
  a first output end; and
  a second output end;
a first inductor comprising:
  an input end; and
  an output end;
a first resistor comprising:
  an input end coupled to the output end of the first inductor and the first input end of the error detection sub-circuit; and
  an output end that is grounded;
a second inductor comprising:
  an input end; and
  an output end coupled to the output end of the first inductor;
a second resistor comprising
  an input end coupled to the output end of the second inductor and to the second input end of the error detection sub-circuit; and
  an output end that is grounded;
a first error adjustment sub-circuit comprising:
  a first input end coupled to the first output end of the error detection sub-circuit, wherein the first input end of the first error adjustment sub-circuit is configured to receive a preset input signal and a voltage signal from the first output end of the error detection sub-circuit; and
  a second input end coupled to the first output end of the error detection sub-circuit, wherein the second input end of the first error adjustment sub-circuit is configured to receive the preset input signal and the voltage signal from the first output end of the error detection sub-circuit, wherein the first error adjustment sub-circuit is configured to adjust an input current of the first inductor based on the preset input signal and the voltage signal from the first output end of the error detection sub-circuit; and
a second error adjustment sub-circuit comprising:
  a first input end coupled to the second output end of the error detection sub-circuit, wherein the first input end of the second error adjustment sub-circuit is configured to receive the preset input signal and a voltage signal from the second output end of the error detection sub-circuit;
  a second input end coupled to the second output end of the error detection sub-circuit, wherein the second input end of the second error adjustment sub-circuit is configured to:
    receive the preset input signal and the voltage signal from the second output end of the error detection sub-circuit; and
    adjust an input current of the second inductor based on the preset input signal and the voltage signal from the second input end of the error detection sub-circuit.

12. The current equalization array circuit of claim 11, wherein the error detection sub-circuit comprises:
an operational transimpedance amplifier comprising:
  a first input end coupled to the input end of the first resistor;
  a second input end coupled to the input end of the second resistor;
  a first output end coupled to the first input end of the first error adjustment sub-circuit; and
  a second output end coupled to the first input end of the second error adjustment sub-circuit;
a third resistor comprising:
  an input end that receives a preset voltage signal; and
  an output end coupled to the first input end of the first error adjustment sub-circuit;
a fourth resistor comprising:
  an input end that receives the preset voltage signal; and an output end coupled to the first input end of the second error adjustment sub-circuit.

13. The current equalization array circuit of claim 12, further comprising:
a first current detection sub-circuit comprising:
an input end coupled to the output end of the first inductor, wherein the first current detection sub-circuit is configured to:
detect a sampled current of the first inductor; and
perform scaling processing on the sampled current of the first inductor; and
an output end coupled to the input end of the first resistor; and
a second current detection sub-circuit comprising:
an input end coupled to the output end of the second inductor, wherein the second current detection sub-circuit is configured to:
detect a sampled current of the second inductor; and
perform scaling processing on the sampled current of the second inductor; and
an output end coupled to both the output end of the first current detection sub-circuit and the input end of the second resistor.

14. The current equalization array circuit of claim 13, wherein the error detection sub-circuit further comprises:
an output voltage feedback sub-circuit comprising:
an input end coupled to the output end of the first current detection sub-circuit and the output end of the second current detection sub-circuit, wherein the input end of the output voltage feedback sub-circuit is configured to:
receive a current signal of the first inductor and a current signal of the second inductor;
convert the current signal of the first inductor and the current signal of the second inductor into a converted voltage signal; and
perform voltage division processing on the converted voltage signal obtained to obtain a voltage divided voltage signal;
a first output end;
a second output end that is grounded; and
a third output end that is grounded; and
a voltage regulation sub-circuit comprising:
a first input end coupled to the first output end of the output voltage feedback sub-circuit, wherein the first input end is configured to:
receive the voltage divided voltage signal after the voltage division processing performed by the output voltage feedback sub-circuit; and
adjust, based on a reference voltage signal, the voltage divided voltage signal obtained after the voltage division processing performed by the output voltage feedback sub-circuit such that the output end of the voltage regulation sub-circuit inputs the preset voltage signal to the input end of the third resistor and the input end of the fourth resistor;
a second input end that receives the reference voltage signal; and
an output end coupled to the input end of the third resistor and the input end of the fourth resistor.

15. The current equalization array circuit of claim 14, wherein the voltage regulation sub-circuit comprises:
an error amplifier comprising:
a first input end;
a second input end that receives the reference voltage signal; and
an output end coupled to the input end of the third resistor and the input end of the fourth resistor;
a first impedance network comprising:
an input end coupled to the first output end of the output voltage feedback sub-circuit;
an output end coupled to the first input end of the error amplifier;
a second impedance network comprising:
an input end coupled to the first input end of the error amplifier;
an output end coupled to the input end of the third resistor and the input end of the fourth resistor.

16. The current equalization array circuit of claim 14, wherein the output voltage feedback sub-circuit comprises:
a fifth resistor comprising:
an input end coupled to the output end of the first current detection sub-circuit and the output end of the second current detection sub-circuit; and
an output end coupled to the input end of the voltage regulation sub-circuit;
a sixth resistor comprising:
an input end coupled to the output end of the fifth resistor; and
an output end that is grounded; and
a capacitor comprising:
an input end coupled to the output end of the first current detection sub-circuit and the output end of the second current detection sub-circuit; and
an output end that is grounded.

17. The current equalization array circuit of claim 11, wherein the first error adjustment sub-circuit comprises:
a first pulse width modulation (PWM) comparator comprising:
a first input end coupled to the first output end of the error detection sub-circuit;
a second input end that receives the preset input signal; and
an output end;
a first reset-set (RS) flip-flop comprising:
a first input end coupled to the output end of the first PWM comparator;
a second input end that receives a preset square wave signal;
a first output end; and
a second output end; and
a first power-stage adjustment sub-circuit comprising:
a first input end coupled to the first output end of the first RS flip-flop;
a second input end coupled to the second output end of the first RS flip-flop, wherein the first power-stage adjustment sub-circuit is configured to adjust the input current of the first inductor based on a signal at the first output end of the first RS flip-flop and a signal at the second output end of the first RS flip-flop; and
an output end coupled to the input end of the first inductor.

18. The current equalization array circuit of claim 17, wherein the first power-stage adjustment sub-circuit comprises:
a first drive sub-circuit comprising:
an input end coupled to the first output end of the first RS flip-flop; and
an output;
a second drive sub-circuit comprising:
an input end coupled to the second output end of the first RS flip-flop; and an output end;
a first metal oxide semiconductor (MOS) transistor comprising:
   a gate coupled to the output end of the first drive sub-circuit;
   a drain coupled to the input end of the first inductor; and
   a source that is grounded;
a second MOS transistor comprising:
   a gate coupled to the output end of the second drive sub-circuit;
   a drain coupled to a first power supply; and
   a source coupled to the input end of the first inductor.

19. The current equalization array circuit of claim 11, wherein the second error adjustment sub-circuit comprises:
a second PWM comparator comprising:
   a first input end coupled to the first output end of the error detection sub-circuit;
   a second input end that receives the preset input signal; and
   an output end;
a second RS flip-flop comprising:
   a first input end coupled to the output end of the second PWM comparator;
   a second input end that receives a preset square wave signal;
   a first output; and
   a second output; and
a second power-stage adjustment sub-circuit comprising:
   a first input end coupled to the first output end of the second RS flip-flop;
   a second input end coupled to the second output of the second RS flip-flop; and
   an output end coupled to the input end of the second inductor, wherein the second power-stage adjustment sub-circuit is configured to adjust the input current of the second inductor based on a signal at the first output end of the second RS flip-flop and a signal at the second output end of the second RS flip-flop.

20. The current equalization array circuit of claim 19, wherein the second power-stage adjustment sub-circuit comprises:
a third drive sub-circuit comprising:
   an input end coupled to the first output end of the second RS flip-flop; and
   an output end;
a fourth drive sub-circuit comprising:
   an input end coupled to the second output end of the second RS flip-flop; and
   an output end;
a third MOS transistor comprising:
   a gate coupled to the output end of the third drive sub-circuit;
   a drain coupled to the input end of the second inductor; and
   a source that is grounded; and
a fourth MOS transistor comprising:
   a gate coupled to the output end of the fourth drive sub-circuit;
   a drain coupled to a second power supply; and
   a source coupled to the input end of the second inductor.

* * * * *